(12) United States Patent
Jamadar et al.

(10) Patent No.: US 11,951,495 B2
(45) Date of Patent: Apr. 9, 2024

(54) PROCESS FOR COATING A CARRIER MATERIAL WITH AN ACTIVE MATERIAL FOR THE PRODUCTION OF AN ELECTRODE FOIL OF A BATTERY CELL

(71) Applicant: VOLKSWAGEN AKTIENGESELLSCHAFT, Wolfsburg (DE)

(72) Inventors: Kartik Jamadar, Wolfsburg (DE); Bastian Westphal, Braunschweig (DE); Sven Schopf, Braunschweig (DE); Priyanka Gangurde, Nashik (IN)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/703,732

(22) Filed: Mar. 24, 2022

(65) Prior Publication Data

US 2022/0305503 A1    Sep. 29, 2022

(30) Foreign Application Priority Data

Mar. 26, 2021    (DE) .................... 10 2021 107 621.8

(51) Int. Cl.
*C23C 24/04*    (2006.01)
*B05B 1/34*    (2006.01)
*H01M 4/04*    (2006.01)

(52) U.S. Cl.
CPC ......... *B05B 1/3402* (2018.08); *H01M 4/0404* (2013.01); *H01M 4/0419* (2013.01)

(58) Field of Classification Search
CPC .......... B05B 7/00; B05D 1/12; H01M 4/0419; H01M 4/0404; C23C 4/12; C23C 24/04

USPC .................................................. 118/308, 310
See application file for complete search history.

(56) References Cited

U.S. PATENT DOCUMENTS

| | | | |
|---|---|---|---|
| 8,936,830 B2 | 1/2015 | Kim | |
| 2003/0219542 A1 | 11/2003 | Ewasyshyn et al. | |
| 2005/0040260 A1* | 2/2005 | Zhao ..................... | B05B 7/1486 239/548 |
| 2005/0233066 A1* | 10/2005 | Sunagawa ............. | H01M 4/364 429/231.95 |
| 2007/0277370 A1* | 12/2007 | Kalynushkin ......... | H01M 4/134 29/730 |
| 2012/0028128 A1* | 2/2012 | Seino .................. | C01G 45/1242 429/304 |
| 2013/0149471 A1* | 6/2013 | Kim ........................ | B05D 1/12 427/180 |

(Continued)

FOREIGN PATENT DOCUMENTS

DE    10 2018 219 153 A1    5/2020

OTHER PUBLICATIONS

Office Action for German Patent Application No. 10 2021 107 621.8, dated Oct. 6, 2021.

*Primary Examiner* — Tabassom Tadayyon Eslami
(74) *Attorney, Agent, or Firm* — PEARL COHEN ZEDEK LATZER BARATZ LLP

(57) ABSTRACT

A process for coating a carrier material with an active material for production of an electrode foil of a battery cell with a Laval nozzle, wherein the Laval nozzle has at least one converging first portion, one second portion having a smallest flow cross section, and one diverging third portion arranged one after the other along a flow direction.

12 Claims, 4 Drawing Sheets

(56) References Cited

U.S. PATENT DOCUMENTS

2016/0024633 A1* 1/2016 Xue .................. C23C 24/04
 239/398
2018/0138494 A1* 5/2018 Birt .................. H01M 4/382
2020/0176752 A1 6/2020 Birt et al.

* cited by examiner

PROCESS FOR COATING A CARRIER MATERIAL WITH AN ACTIVE MATERIAL FOR THE PRODUCTION OF AN ELECTRODE FOIL OF A BATTERY CELL

CROSS REFERENCE TO RELATED APPLICATION

This application claims priority from German Patent Application No. 10 2021 107 621.8, filed on Mar. 26, 2021, which is hereby incorporated by reference ion its entirety.

FIELD OF THE INVENTION

The invention relates to a process for coating a carrier material with an active material for production of an electrode foil for a battery cell. The carrier material comprises in particular a tape-like carrier material.

BACKGROUND OF THE INVENTION

Batteries, in particular lithium-ion batteries, are increasingly being used to drive motor vehicles. Batteries are typically composed of cells, wherein each cell has a stack of anode, cathode, and separator sheets. At least some of the anode and cathode sheets are designed as current collectors to divert the current provided by the cell to a consumer arranged outside the cell.

During the production of a lithium-ion battery cell, what is known as a carrier material, in particular a strip-shaped carrier material, e.g. a carrier foil, is coated on both sides with a slurry by means of an application tool. The slurry consists of a plurality of components, including an active material, conductive carbon black, binders, solvents, and other additives if necessary. After the coating has been carried out on one side in each case, the coated carrier material is supplied into a drying process in order to evaporate the solvent it contains and to bond the remaining constituents firmly to the carrier foil. The carrier foil forms a current collector for the battery cell.

The coating produced in this way is porous. The porosity is reduced by calendering because the coating is compressed in this case. Compression is required to increase specific capacity (by volume) and electrical conductivity.

The known process of coating the anode and cathode with a slurry, subsequent drying, and final calendering and cutting has the following problems:
- there are additional costs and energy requirements for the drying solvent (e.g. NMP-N-methyl-2-pyrrolidone— for the cathode, and water for the anode);
- compression must be achieved by calendering, this process causing the formation of folds and requiring complex machine technology;
- it is difficult to produce coatings of different layers with different densities from each other; for this purpose, the coating-calendering-coating-calendering cycle may have to be carried out more frequently, thereby increasing the production time and operating costs;
- there is poor adhesion of the coating so delamination can occur.

Dry coating (solvent-free) is suggested by some vendors as an alternative to wet coating (with a slurry). However, dry coating has the following disadvantages:
- after dry coating, a heated calendering process is required to melt and evenly distribute the binder; this increases costs
- in this case, too, different layers with different densities are difficult to produce;
- the adhesion of the active material to the carrier material (before calendering) is low.

The known processes therefore have the following disadvantages:
- the coated carrier material has to go through various processes such as coating and calendering;
- the carrier material must be wound up again after each process step; this results in bending stresses on the electrode and also in particle contamination;
- the individual processes increase the space requirement, the costs, and also the rejects;
- layered coating and layered compression in the calendar are difficult;
- drying and recycling of the solvent are energy-intensive processes and also incur high costs;
- the solvent NMP is hazardous and must be handled with care;
- the viscosity of the slip plays a crucial role in the quality of the coating; the rheology depends on the conductive carbon, binder, and solvent;
- air/gas entrapment problems in the wet coating can occur if degassing is not properly performed;
- the adhesion of the coating to the carrier material depends on the drying zones; drying too quickly can cause cracks and/or reduced adhesion;
- calendering presents problems such as the formation of folds due to uneven stretching of coated and uncoated regions;
- high calendering compression can result in lithium plating in the anode;
- low compression in the cathode can result in loss of conductivity.

There are known solutions to solve the problems associated with wet coating. Replacing wet coating with dry coating (solvent-free coating) is mainly done in two different ways:
- dry mixes are sprayed onto the substrate by electrostatic discharge using the aerosol principle; this creates porous layers of the coating; the coating is then calendered at high temperature (about 150° C.) so that the binder is softened and evenly dispersed;
- the dry mixture is applied to the substrate with a roller/shaker/screen and then calendered under temperature conditions; a spray mechanism is not necessary, i.e. coating and calendering are integrated in one operation, or calendering can be carried out subsequently with additional rollers.

The above solutions still have the following problems:
- severe mixing stress during dry mixing can result in agglomeration of the conductive carbon black and impair the viscosity;
- the sole adhesion of the coating by electrostatic aerosol discharge is low; this results in post-coating delaminations during winding; a calendering process is required for compression;
- the formation of folds on the carrier material in processes in which coating and calendering is carried out by means of a roller; in this case, calendar rollers have to be heated, so that there is a high energy consumption.

It is known from US 2013/273407 A1 now abandoned to provide an active material of an electrode foil with a heat-resistant coating. This coating is applied in the form of a dry coating via a Laval nozzle.

U.S. Pat. No. 8,936,830 B2 relates to a process and an apparatus for the uniform, continuous coating of a carrier material. The coating material is applied to the carrier material via a Laval nozzle.

A process for applying a coating via a supersonic nozzle is known from US 2003/0219542 A1 now abandoned and US 2002/0168466 A1 now U.S. Pat. No. 6,915,964.

An apparatus for production of a battery cell is known from U.S. Pat. No. 8,142,569 B2. A metal foil is coated with an active material. Coating is carried out via a Laval nozzle.

SUMMARY OF THE INVENTION

The object of the present invention is to at least partially solve the problems set forth with reference to the prior art. In particular, a process is to be proposed by means of which an active material can be arranged on a carrier material. The aim is to achieve a high level of effectiveness in the production process while at the same time keeping costs low and product quality high.

A process with the features according to the independent claim contributes to solving these problems. Advantageous refinements are the subject matter of the dependent claims. The features listed individually in the claims can be combined with one another in a technologically sensible manner and can be supplemented by explanatory facts from the description and/or details from the figures, in which further variants of embodiments of the invention are shown.

A process for coating a carrier material with an active material for production of an electrode foil of a battery cell is proposed. Coating is carried out by means of a Laval nozzle, the Laval nozzle having at least one converging first portion, a second portion with a smallest flow cross section (the Laval nozzle or the three portions), and a diverging third portion arranged one after the other along a flow direction. The process comprises at least the following steps:
 a) introducing a first gas stream via the first portion into the Laval nozzle;
 b) introducing a first particle stream, at least comprising the active material or a binding material for the active material, via the third portion into the Laval nozzle;
 c) mixing the first gas stream and the first particle stream and accelerating the particle stream via the first gas stream flowing at a supersonic speed in the third portion;
 d) subjecting the carrier material to the first particle stream to form a layer of a coating.

The above classification (which is not exhaustive) of the process steps into a) to d) should serve primarily only for differentiation and not to enforce a sequence and/or dependency. The frequency of the process steps can also vary. It is also possible that process steps overlap one another at least partially in time. Steps a) to d) very particularly preferably take place at least temporarily in parallel with one another. Steps b) to d) take place in particular after or at the same time as step a).

In particular, only one Laval nozzle is used as part of the process, i.e. the gas streams and/or particle streams pass through only one Laval nozzle (at least partially). However, differently designed Laval nozzles can be used for different layers of the coating, so that the coating is then produced overall by different Laval nozzles.

A Laval nozzle is known in principle. These usually comprise a converging first portion, a second portion having a smallest flow cross section, and a diverging third portion. The Laval nozzle has an inlet upstream of the first portion and an outlet downstream of the third portion. The Laval nozzle extends between the inlet and outlet along the flow direction over a total length. The individual portions each extend over a certain length.

The principle of the Laval nozzle is based on the different properties of gases flowing at subsonic and supersonic speeds. The speed of a subsonic gas stream increases as the cross section through which it can flow progressively narrows, since the mass flow rate is constant. In particular, the gas stream through a Laval nozzle is isentropic (gas entropy is nearly constant). In the case of a subsonic flow, sound propagates through the gas. In the second portion in which the cross-sectional area or the flow cross section is minimal, the gas speed becomes locally supersonic (Mach number=1.0), a condition that is referred to as choked flow. When the flowable cross-sectional area of the Laval nozzle increases again in the third portion, the gas begins to expand and the gas flow increases to supersonic speeds. A choked flow is only produced at a Laval nozzle if the pressure and the mass flow through the nozzle are sufficient to reach the speeds of sound. Otherwise, supersonic flow will not be achieved and the Laval nozzle will behave like a Venturi tube. In the case of the Laval nozzle, the inlet pressure in the nozzle must always be well above the ambient pressure. In addition, the pressure of the gas at the outlet of the third portion of a Laval nozzle should not be too low. In practice, the ambient pressure must not be higher than about 2 times the pressure in the supersonic gas stream at the outlet, so that the supersonic flow can leave the nozzle.

In particular, a solvent-free coating of a carrier material is proposed. Solvent-free dry particle coating is an ideal alternative to the wet slurry process because it eliminates the cost of solvent and the cost of removing and recovering it. With the proposed process, dry powder can be used for the coating. In other words, no solvent is used. The coating is sprayed onto the carrier material and not by electrostatic discharge (with Venturi/aerosol techniques).

With the Laval nozzle, a supersonic speed of the gas medium at the outlet of the Laval nozzle can be set. In other words, the particles are accelerated to a very high speed and thus impact the carrier material. Due to the high kinetic energy, the dry mixture adheres sufficiently strongly to the carrier material. In addition, the coating already has a high density immediately after coating, so that calendering for (further) compression of the active material in particular is not necessary.

In the case of calendering, the coated carrier material is guided through an arrangement of rollers which are optionally temperature-controlled and can therefore heat the coated carrier material. The coating is compressed by the rollers. Increasing the density of a layer of the coating by at least 20% is usually carried out.

In particular, a binder or a binding material is only required in small amounts because the high kinetic energy binds the active material in the coating with one another by means of solid-state welding.

Coating can be carried out in a plurality of layers or the coating can have a plurality of layers applied one after the other. In particular, the last layer applied is heated and leveled according to the well-known principle of strip drawing (levelling). Each layer can have a different chemistry, density, and thickness. Desired properties with regard to electrolyte diffusion, electrical conductivity, adhesion of the coating to the carrier material, and solid-state welding of the particles to one another can thus be set.

After coating, the electrode foil produced in this way can be subjected to skin drawing, so that the final thickness of the electrode foil is adjusted. Skin drawing compresses both sides of the coating or coated carrier material, while strip drawing (leveling/smoothing) only works on one side of the coating.

A final manufacturing step comprises notching which takes place before winding. In this case, the (uncoated) collector region or diverter is brought into its final shape with the help of a stamping process.

In particular, before step d), i.e. before the coating, the carrier material is cut to the final dimensions (width) provided for the electrode foil. In particular, a width of the carrier material can be coated using a Laval nozzle without a relative movement between the carrier material and the Laval nozzle in the direction of the width being necessary. If necessary, however, a plurality of Laval nozzles can be used, which coat the carrier material together, i.e. with coating strips arranged next to one another along the width.

The main advantages of the proposed process are:
  after coating, no calendering is required, since the density of the coating required for use of the electrode foil is achieved by the high speed of the deposited particles;
  the dry mixed powder, i.e. the active material and/or the binding material, is supplied into the third portion of the Laval nozzle; this means that in particular at least some of the particles are not heated, but are only accelerated by the gas stream exiting the Laval nozzle;
  the Laval nozzle creates supersonic speed for particle precipitation;
  for cost reasons, dry air or nitrogen (instead of helium) can be used for the gas stream.

In the present case, the Laval nozzle is designed in particular such that a pressure in the gas stream within the third portion, preferably at the outlet of the Laval nozzle, corresponds to an ambient pressure or is slightly lower (e.g. up to 20% lower) than an ambient pressure.

In particular, when the first gas stream enters the first portion, it is traveling at subsonic speeds. Due to the converging first portion down to the smallest flow cross section, the gas stream is accelerated. In the second portion, in which the flow cross section is minimal, the speed of the gas stream along the flow direction becomes supersonic. Downstream of the smallest flow cross section, i.e. in the diverging third portion, the flow cross section becomes increasingly larger. The gas in the gas stream expands, and the speed of the gas stream increases more and more into the supersonic range.

The first gas stream comprises at least one of nitrogen, helium, a mixture of nitrogen and helium, or air. The first gas stream can have a high degree of purity in relation to the constituents mentioned. The first gas stream can thus have for example the corresponding component, i.e. nitrogen, helium, a mixture of nitrogen and helium, or air, at least at 95 vol.-%.

The gas stream is provided at the inlet of the Laval nozzle, i.e. upstream of the first portion, in particular at a pressure of 2 to 15 bar, preferably 3 to 12 bar. In particular, the first gas stream has a temperature of at most 120 degrees Celsius, preferably at most 105 degrees Celsius. The first gas stream particularly preferably has a temperature of at least 80 degrees Celsius there, preferably at least 90 degrees Celsius.

At the outlet of the Laval nozzle, i.e. downstream of the third portion, the gas stream has, in particular, a pressure of 1 to 2 bar. There, the gas stream has a temperature of between 40 and 80 degrees Celsius, in particular between 50 and 70 degrees Celsius.

The first gas stream has in particular a volume flow of 15 to 30 cubic meters per hour.

At the outlet, the first gas stream reaches in particular a Mach number of 1 to 5, preferably 1 to 3.

A distance between the carrier material and the outlet can be between 5 and 40 millimeters, in particular between 10 and 30 millimeters.

The speed of the particles exiting from the outlet with the gas stream is in particular (as an average value) between 70 and 90% of the speed of the (e.g. first) gas stream.

The particle stream exiting from the outlet of the Laval nozzle is directed onto the carrier material, so that an interaction between the particle stream and the carrier material is generated.

For a precipitation of particles on the carrier material, the particles should move at a critical speed. The critical speed depends on the coating particle. If a particle speed is lower than the critical speed, the particle bounces off the carrier material. If the particle speed is greater than the critical speed, the particles will penetrate the substrate and destroy it. The particles, the speed of which is equal to the critical speed, are applied to the substrate.

Therefore, a high critical speed is required for the particles. In the present process, the particles reach supersonic speed when they are accelerated by means of the first gas stream. The temperature and pressure parameters can be changed to adjust the kinetic energy of the particles. In the present process, the active material is strongly compressed as a result of the precipitation via the Laval nozzle, so that a high density can be achieved. In particular, no subsequent compression and/or calendering is required.

In the case of known Venturi tube precipitations, such high speeds are not achieved. A temperature of the gas stream has no effect in this case. The speed is only changed by the pressure. The densities of the carrier material achieved in this way are too low, so that calendering is still necessary.

In particular, the carrier material is thoroughly cleaned before coating to remove oil, grease, dirt, paint, and other foreign matter. In particular, the surface of the substrate is roughened to improve the interaction between the coating and the carrier material and to reduce/remove the inherent oxide layer on the surface. There are various processes for cleaning the surface, such as plasma jet cleaning, ultrasonic cleaning, or blasting.

The carrier material used consists in particular of 10 to 12 μm thick copper for the anode and 12 to 15 μm thick aluminum for the cathode.

After cleaning, the carrier material is first cut to a smaller width, in particular by mechanical slitting, laser, water jet, or ultrasonic cutting. Slitting is carried out in particular before coating, so that the precipitation can be carried out on the final required width of the carrier material. If slitting or cutting of the carrier material or the coated carrier material is not carried out until after coating, layers with less dense powder can adhere to the blade and also to the cutting edge.

In particular, different coating layers having different densities can be produced with the Laval nozzle.

In particular, the material of the coating to be applied is in powder form and solvent-free.

In particular, the material of the first particle stream is in powder form and solvent-free.

In particular, it comprises at least one of conductive carbon black, NMC (lithium-nickel-cobalt-manganese as a lithium-storing active material), graphite (as a lithium-storing active material), CNT (carbon nano tubes), SBR (styrene-butadiene rubber as a binder), CMC (carboxymethyl cellulose polymer), PVDF (polyvinylidene fluoride), or porous graphite. The components of the material that are not binding material are classified as active material in the following.

The material of the coating to be applied comprises, for example for a cathode, 2% conductive carbon black, 0.5% CNT, 2% porous graphite, PVDF, and NMC.

The material of the coating to be applied comprises, for example for an anode, 2% conductive carbon black, 0.5% CNT, 2% porous graphite, 3 to 4% SBR, 1 to 2% CMC, remainder of (non-porous) graphite.

The particle size, in particular the median of the particles of the at least one particle stream, is in particular between 5 and 100 µm in diameter.

With the supply of the first particle stream in the third portion, for example, a higher temperature for the first gas stream can be set, so that the speed of the gas stream can be adjusted. At least partial melting of the particles of the first particle stream, for example the binding material, or an undesirable agglomeration of particles of the first particle stream, for example of conductive carbon black, can be prevented.

An agglomeration of the particles is, for example, detrimental to the flowability of the particle stream and can, for example, affect the achievable density of the coating.

Furthermore, a clogging of the Laval nozzle in the second portion can be prevented in this way, since at least part of the material of the coating to be applied is supplied downstream of the second portion.

Furthermore, laminar flow conditions prevail in the third portion, as opposed to the more turbulent flow conditions in the second portion. This causes less friction in the material intended for the coating and the material can be accelerated to higher speeds.

In particular, the first particle stream is mixed with a second gas stream before being introduced into the third portion. In particular, the second gas stream is branched off from the first gas stream. However, a separate gas stream can also be produced. The first particle stream can be better introduced into the third portion and distributed there by the second gas stream.

The statements relating to the first gas stream can be transferred in particular to the second (or third) gas stream and vice versa.

In particular, the first particle stream is introduced into the third portion via a plurality of inlet openings. In particular, at least two, preferably at least three, particularly preferably at least four, inlet openings are provided.

In particular, at least two inlet openings are arranged at different distances from one another from the smallest flow cross section. In particular, the difference in distances is at least 3 to 15 millimeters, preferably 3 to 8 millimeters.

In particular, at least two inlet openings are arranged offset to one another along a circumferential direction running transversely to the flow direction. In particular, the inlet openings are arranged in a distributed manner and evenly along the circumferential direction.

The generation of turbulence can be prevented by the plurality of inlet openings and their possibly special arrangement.

In particular, the active material (in particular without binding material) is introduced as a second particle stream via the first portion and the binding material (with or without active material) as the first particle stream via the third portion into the Laval nozzle. In particular, each particle stream can be mixed with a second (or third) gas stream before it is introduced into the corresponding portion.

With the supply of the binding material via the third portion, a melting of the binder particles can be prevented.

With the supply of the active material via the first portion, the active material can be heated via the temperature of the first gas stream set there, and the particles of the second particle stream can thus be softened. However, a melting point of the active material is not exceeded in this case.

In particular, a third gas stream is introduced via the third portion into the Laval nozzle. In particular, the third gas stream is introduced into the third portion via its own inlet opening. In particular, the third gas stream is supplied to the third portion alone (i.e. without a particle stream supplied via the same inlet opening).

In particular, the third gas stream is used for the additional mixing of the binding material supplied to the third portion with the second particle stream supplied via the first portion. In particular, the third gas stream is intended to generate additional turbulence in the third portion and thus bring about better mixing of the particle streams.

In particular, the supply of a particle stream and/or a gas stream into the Laval nozzle can be controlled via a controllable valve in each case.

In particular, steps a) to d) are carried out several times one after the other for the carrier material, so that the active material is applied in a plurality of layers. In particular, between the individual runs of steps a) to d), i.e. in particular after each applied layer of the coating, a thermal treatment, cooling or heating, of the coated carrier material and/or strip drawing of the surface of the coating is carried out.

In particular, immediately after (each) coating of the carrier material, a cooling process is carried out first, as a result of which the coating is cooled.

In particular, heating of the coated carrier material, in particular to a temperature between 100 and 140 degrees Celsius, preferably between 110 and 130 degrees Celsius, is carried out immediately before skin drawing or strip drawing.

In particular, a first (first applied) layer of the coating has a first thickness, and a second layer applied subsequently to the first layer has a second thickness, wherein the second thickness is greater than the first thickness. In particular, for example the first thickness is between 5 and 20 µm and the second thickness is between 20 and 40 µm. Further layers can each have thicknesses between 20 and 60 µm. In particular, a third layer is also thicker than the second layer.

In particular, a first (first applied) layer of the coating has a first density, and a second layer applied subsequently to the first layer has a second density, wherein the second density is lower than the first density. Further layers can each have different densities. In particular, a third layer also has a lower density than the second layer. The density of each layer can be set in particular by regulating the pressure of the at least one gas stream (in particular the first gas stream).

In particular, each layer can have at least its own, possibly a different, configuration with regard to at least one of the following parameters: density, thickness, composition.

In particular, a density of the at least one layer of the coating after step d) is further increased by at most 10%, preferably by at most 5%, particularly preferably by at most 2%.

A Laval nozzle has in particular a converging first portion upstream in the flow direction and a diverging third portion downstream in the flow direction. The properties of a Laval nozzle are determined by the contour and the length of the diverging third portion and also by the ratio of the outlet cross section to the smallest flow cross section (expansion ratio). The smallest flow cross section is arranged in the second portion or forms the second portion. The Laval nozzles used in this case can be conical in the third portion (constant angle of widening) or bell-shaped (angle of widening which is increasingly smaller along the length of the third portion).

In particular, the bell-shaped contour of the third portion allows better application behavior of the particles to be applied. It is therefore particularly advantageous if the entire third portion is designed in the shape of a bell. However, only part of the third portion can be in the shape of a bell and the rest of the third portion can be different, for example designed as a cone or as a cylinder. The beginning of the third portion, i.e. the connection to the second portion, should preferably be in the shape of a bell. The bell shape should extend along the flow direction over at least 30% or at least 50% of the length of the third portion. After that, the rest of the third portion can transition into another form. In particular, an abrupt transition from the bell shape to a cone or to a cylinder should be avoided. Abrupt transitions can disturb the uniformity (laminar flow) of the gas stream or particle stream.

The length of the third portion extends in particular along the flow direction between the smallest flow cross section or the start of the diverging portion and the outlet of the Laval nozzle.

The bell-shaped, diverging shape of the third portion produces a particularly pronounced laminar flow of the gas stream or particle stream. This allows the highest speed for the particles in the particle stream to be achieved, since friction is reduced to a minimum.

Advantageous coating results can be achieved with Laval nozzles having an expansion ratio (diameter of the outlet/diameter of the smallest flow cross section) of between 1 and 25. It is particularly advantageous if the Mach number of the gas stream and/or the particles at the outlet is between 1 and 5, depending on the particle size. Smaller particles require a higher Mach number speed for a high density coating.

In particular, the third portion of the Laval nozzle can have one of the following shapes:

- conical (tapered) shape;
- conical (tapered) shape that turns into a cylindrical shape in flow direction; the transition occurring after 30% or 50% of the length of the third portion;
- shape of a bell;
- shape of a bell, the bell shape changing into a square or pyramidal shape in the flow direction; with the transition occurring after 30% or 50% of the length of the third portion.

In particular, the diameter of the inlet of the Laval nozzle is between 5 and 30 millimeters, in particular from 10 to 20 millimeters. In particular, the diameter of the outlet of the Laval nozzle is between 15 and 60 millimeters, in particular from 20 to 50 millimeters. In particular, a diameter of the smallest flow cross section is between 2 and 5 millimeters. In particular, a length of the first portion along the flow direction is between 10 and 25 millimeters, in particular between 10 and 20 millimeters. In particular, a length of the third portion along the flow direction is between 25 and 40 millimeters, in particular between 30 and 35 millimeters.

The shape of the Laval nozzle can be selected in particular with regard to the density to be achieved or the uniformity of the thickness. A shape of the third portion that is initially bell-shaped and then changes into a square shape is preferably used, since a uniform thickness of the coating can be achieved in this way.

A battery cell is also proposed, at least comprising a housing and at least one electrode foil arranged in said housing, which battery cell is coated with at least one active material by the process described.

The battery cell comprises in particular a housing enclosing a volume and at least one first electrode foil of a first type of electrode arranged in the volume, a second electrode foil of a second type of electrode, and a separator material arranged in between, as well as a liquid electrolyte.

The battery cell is in particular a pouch cell (with a deformable housing consisting of a pouch foil) or a prismatic cell (with a dimensionally stable housing). A pouch foil is a well-known deformable housing part that is used as a housing for so-called pouch cells. It is a composite material, for example comprising a plastics material and aluminum.

The battery cell is in particular a lithium-ion battery cell.

The individual foils of the plurality of electrode foils are arranged one on top of the other and in particular form a stack. The electrode foils are each assigned to different types of electrodes, i.e. they are designed as an anode or a cathode. In this case, anodes and cathodes are arranged alternately and are each separated from one another by the separator material.

A battery cell is a power storage device that is used in a motor vehicle for storing electrical energy. In particular, for example, a motor vehicle has an electric machine for driving the motor vehicle (a traction drive), wherein the electric machine can be driven by the electrical energy stored in the battery cell.

A motor vehicle is also proposed, at least comprising a traction drive and a battery having at least one of the battery cells described, wherein the traction drive can be supplied with energy by means of the at least one battery cell.

The process can in particular be carried out by a control unit which is equipped, configured, or programmed to carry out the described process. With the control unit, at least

- advancing the carrier material relative to the at least one Laval nozzle;
- regulating the at least one gas stream;
- regulating the at least one particle stream;
- regulating the above-mentioned parameters, for example pressure, temperature, flow rate are carried out.

In particular, a coating device is proposed which is designed in a particularly suitable manner so that the process described above can be carried out with it.

The coating device comprises in particular the control unit described above.

Furthermore, the process can also be carried out by a computer or with a processor of a control unit.

Accordingly, a system for data processing is also proposed which comprises a processor which is adapted/configured in such a way that it carries out the process or some of the steps of the proposed process.

A computer-readable storage medium can be provided which comprises commands which, when executed by a computer/processor, cause the latter to execute the process or at least some of the steps of the proposed process.

The statements relating to the process can be transferred, in particular, to the battery cell, the motor vehicle. the coating device, the control unit, and the computer-implemented process (i.e. the computer or the processor, the data processing system, the computer-readable storage medium), and vice versa.

The use of indefinite articles ("a" and "an"), in particular in the claims and the description reproducing them, is to be understood as such and not as a numeral. Correspondingly, the terms or components thus introduced are to be understood in such a way that they are present at least once and, in particular, can also be present several times.

As a precaution, it should be noted that the numerals used here ("first," "second," . . . ) serve primarily (only) to differentiate between a plurality of similar objects, sizes or processes, and in particular, therefore, do not necessarily prescribe any dependency and/or sequence of these objects, sizes, or processes relative to one another. Should a dependency and/or sequence be necessary, this is explicitly stated here or it is evident for a person skilled in the art to study the specifically described configuration. If a component can occur more than once ("at least one"), the description of one of these components can apply equally to all or part of the majority of these components, but this is not mandatory.

BRIEF DESCRIPTION OF THE DRAWINGS

The invention and the technical environment are explained in more detail below with reference to the accompanying figures. It should be pointed out that the invention is not intended to be limited by the embodiments mentioned. In particular, unless explicitly stated otherwise, it is also possible to extract partial aspects of the facts explained in the figures and to combine them with other components and findings from the present description. In particular, it should be pointed out that the figures and in particular the proportions shown are only schematic. In the figures.

DETAILED DESCRIPTION OF THE INVENTION

Figure 1:
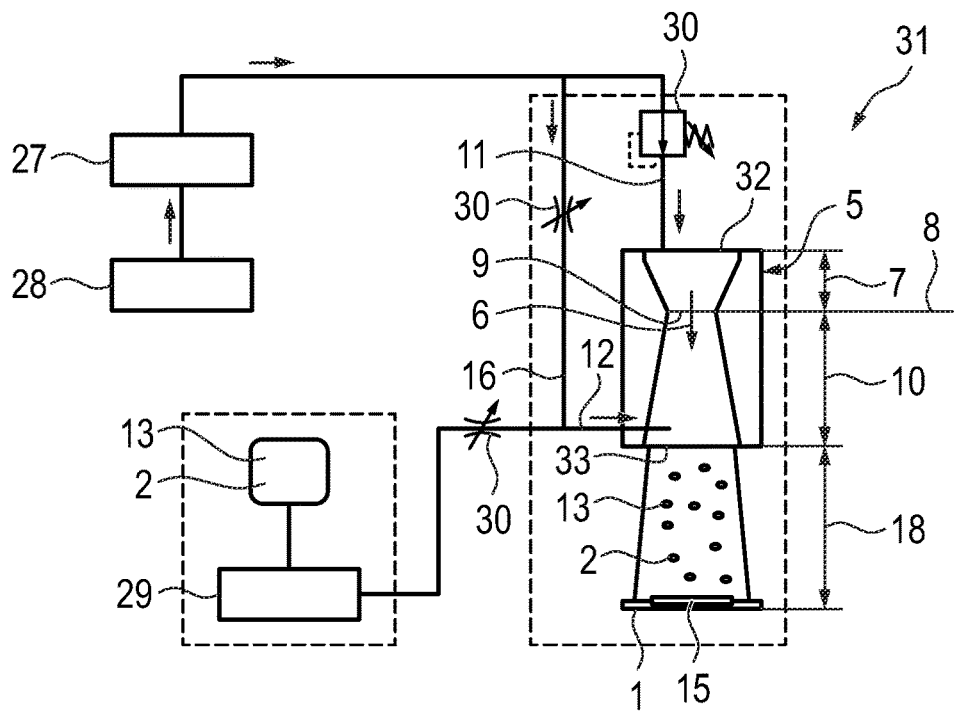
FIG. 1: shows a coating device for carrying out the process according to a first embodiment variant.

FIG. 1 shows a coating device 31 for carrying out the process according to a first embodiment variant. The coating device 31 comprises a Laval nozzle 5 which has a converging first portion 7, a second portion 8 having a smallest flow cross section 9, and a diverging third portion 10 arranged one after the other along a flow direction 6. The Laval nozzle 5 has an inlet 32 upstream of the first portion 7 and an outlet 33 downstream of the third portion 10. The Laval nozzle 5 extends between the inlet 32 and the outlet 33 along the flow direction 6 over a total length. The individual portions 7, 8, 10 each extend over a length 25.

According to step a) of the process, introducing a first gas stream 11 via the inlet 32 into the first portion 7 of the Laval nozzle 5 is carried out. The first gas stream 11 is regulated via a valve 30. The first gas stream 11 has been compressed to a predetermined pressure by a compressor 27 and heated to a predetermined temperature by a heating apparatus 28.

According to step b), introducing a first particle stream 12, at least comprising the active material 2 and a binding material 13 for the active material 2, via the third portion 10 into the Laval nozzle 5 is carried out. The active material 2 and the binding material 13 are mixed with one another in a mixing device 29 and introduced into the third portion 10 via an inlet opening 17 as a common first particle stream 12.

With the supply of the first particle stream 12 in the third portion 10, a higher temperature can be set for the first gas stream 11, so that the speed of the gas stream 11 can be adjusted. At least partial melting of the particles of the first particle stream 12, for example the binding material 13, or an undesirable agglomeration of particles of the active material 2, for example of conductive carbon black, can be prevented.

In addition, clogging of the Laval nozzle 5 in the second portion 8 can be prevented in this way, since the material of the coating 15 to be applied is supplied downstream of the second portion 8.

Laminar flow conditions are also present in the third portion 10, compared to the more turbulent flow conditions in the second portion 8. This causes less friction in the material provided for the coating 15, and the material can be accelerated to higher speeds.

The first particle stream 12 is mixed with a second gas stream 16 before being introduced into the third portion 10. The second gas stream 16 is branched off from the first gas stream 11. The first particle stream 12 can be better introduced into the third portion 10 and distributed there by the second gas stream 16.

According to step c), mixing the first gas stream 11 and the first particle stream 12 in the third portion 10 is carried out, and accelerating the first particle stream 12 by means of the first gas stream 11 flowing at a supersonic speed in the third portion 10 is carried out.

According to step d), subjecting the carrier material 1 to the first particle stream 12 to form a layer 14, 23 of a coating 15 is carried out. A distance 18 between the carrier material 1 and the outlet 33 can be between 5 and 40 millimeters.

Figure 2:
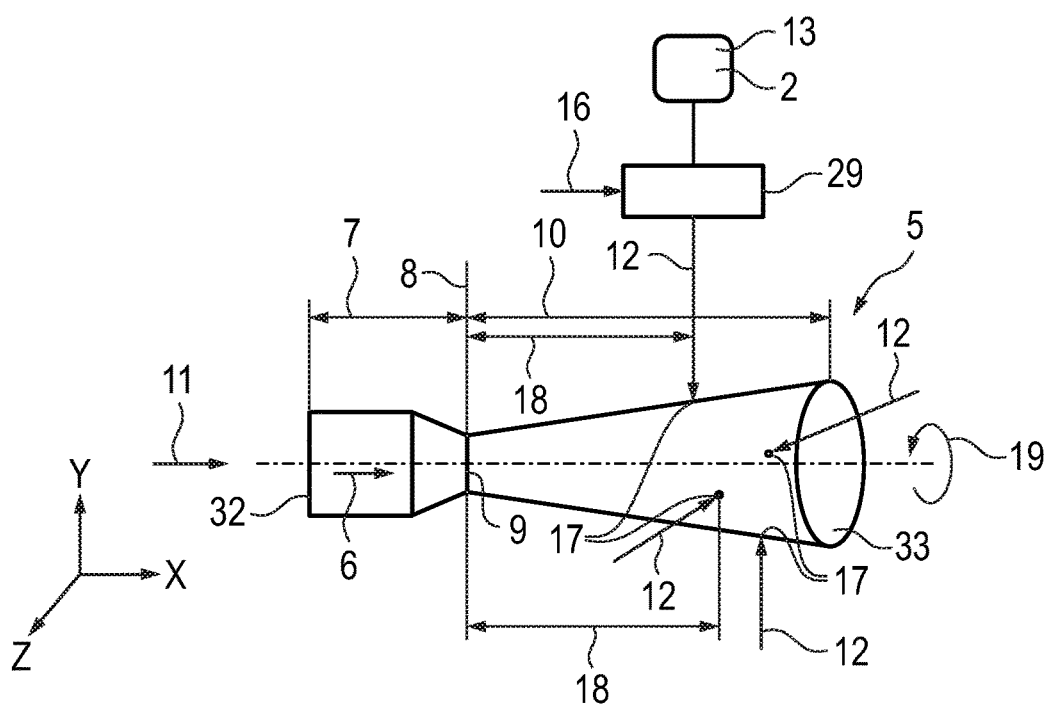
FIG. 2: shows part of a coating device for carrying out the process according to a second embodiment variant.

FIG. 2 shows a part of a coating device 31 for carrying out the process according to a second embodiment variant. Reference is made to the statements on the first embodiment variant.

In contrast to the first embodiment variant, the first particle stream 11 is introduced into the third portion 10 via a plurality of inlet openings 17. Four inlet openings 17 are provided.

The inlet openings 17 are arranged at different distances 18 from the smallest flow cross section 9.

In addition, the inlet openings 17 are arranged offset to one another along a circumferential direction 19 running transversely to the flow direction 6. The inlet openings 17 are arranged in a distributed manner and evenly along the circumferential direction 19, in the present case offset by 90 degrees to one another.

The generation of turbulence in the third portion 10 can be prevented by the plurality of inlet openings 17 and their special arrangement.

Figure 3:
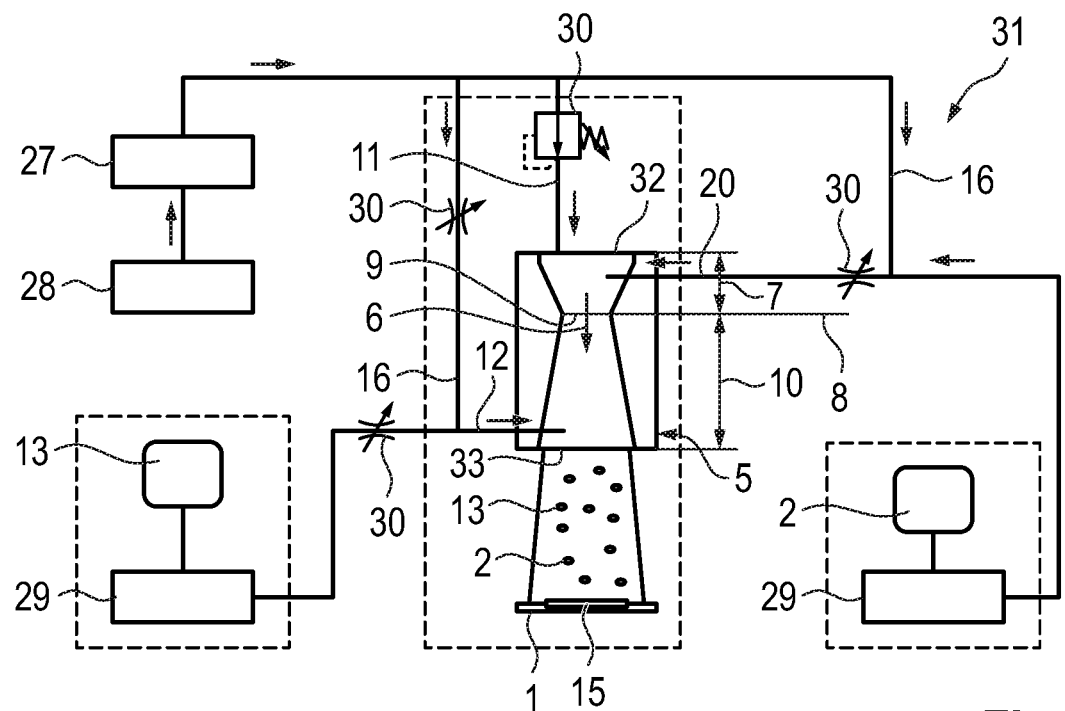
FIG. 3: shows a coating device for carrying out the process according to a third embodiment variant.

FIG. 3 shows a coating device 31 for carrying out the process according to a third embodiment variant. Reference is made to the statements on the first embodiment variant.

In contrast to the first embodiment variant, the active material 2 (without binding material 13) is introduced as a second particle stream 20 via the first portion 7 into the Laval nozzle 5, and the binding material 13 is introduced as the first particle stream 12 via the third portion 10 into said Laval nozzle. Each particle stream 12, 20 is mixed with a second gas stream 16 before it is introduced into the corresponding portion 7, 10. Separate mixing devices 29 are provided for the active material 2 and for the binding material 13.

By the supply of the binding material 13 via the third portion 10, melting of the binder particles can be prevented.

By the supply of the active material 2 via the first portion 7, the active material 2 can be heated via the temperature of the first gas stream 11 set there, and the particles of the second particle stream 20 can thus be softened. In this case, however, a melting point of the active material 2 is not exceeded.

The supply of the gas streams 11, 16 and particle streams 12, 20 is regulated via valves 30 in each case.

Figure 4:
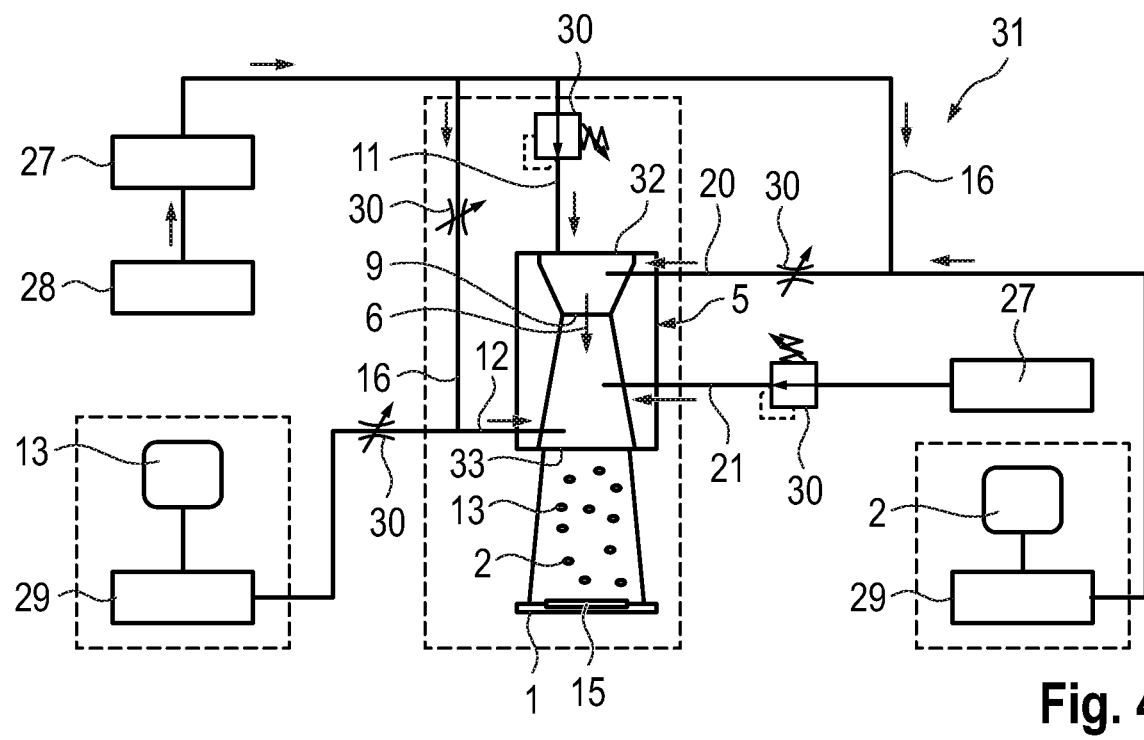
FIG. 4: shows a coating device for carrying out the process according to a fourth embodiment variant.

FIG. 4 shows a coating device 31 for carrying out the process according to a fourth embodiment variant. Reference is made to the statements on the third embodiment variant.

In contrast to the third embodiment variant, a third gas stream 21 is introduced via the third portion 10 into the Laval nozzle 5. The third gas stream 21 is introduced into the third portion 10 via its own inlet opening 17. The third gas stream 21 is supplied to the third portion 10 alone (i.e. without a particle stream 12, 20 supplied via the same inlet opening 17).

The third gas stream 21 serves to additionally mix the binding material 13 supplied to the third portion 10 with the second particle stream 20 supplied via the first section 7. The third gas stream 21 is intended in particular to generate additional turbulence in the third portion 10 and thus bring about better mixing of the particle streams 12, 20.

The supply of each particle stream 12, 20 and each gas stream 11, 16, 21 into the Laval nozzle 5 is controlled via a controllable valve 30 in each case.

Figure 5:
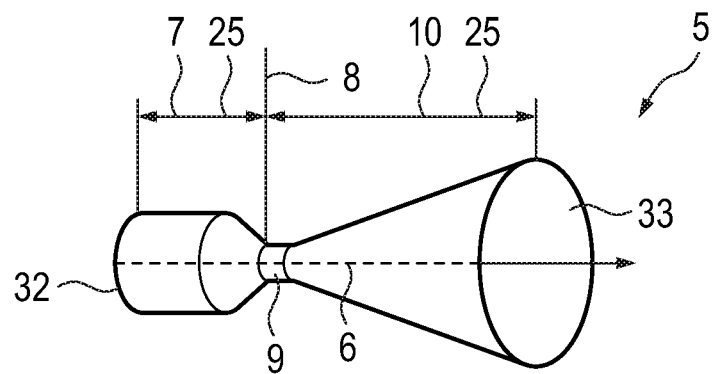
FIG. 5: shows a first embodiment of a Laval nozzle in a perspective view.

FIG. 5 shows a first embodiment of a Laval nozzle 5 in a perspective view. The Laval nozzle 5 has a converging first portion 7, a second portion 8 having a smallest flow cross section 9, and a diverging third portion 10 arranged one after the other along a flow direction 6. The Laval nozzle 5 has an inlet 32 upstream of the first portion 7 and an outlet 33 downstream of the third portion 10. The Laval nozzle 5 extends between the inlet 32 and the outlet 33 along the flow direction 6 over a total length. The individual portions 7, 8, 10 each extend over a length 25.

The properties of a Laval nozzle 5 are determined by the contour and the length 25 of the diverging third portion 10 and additionally by the ratio of the outlet cross section to the smallest flow cross section 9 (expansion ratio). The smallest flow cross section 9 is arranged in the second portion 8 or forms the second portion 8.

The present Laval nozzle 5 is conical in the third portion 10 (constant angle of widening).

Figure 6:
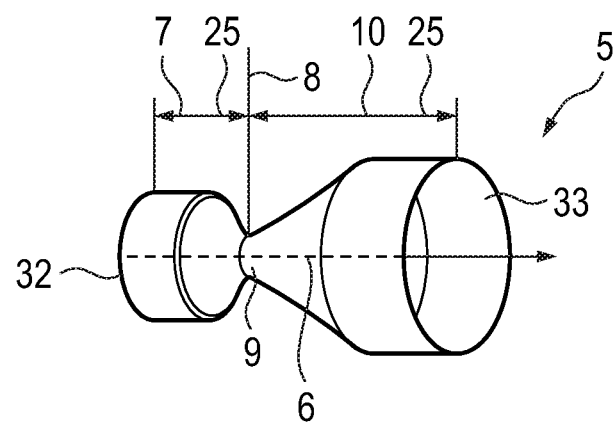
FIG. 6: shows a second embodiment of a Laval nozzle in a perspective view.

FIG. 6 shows a second embodiment of a Laval nozzle 5 in a perspective view. Reference is made to the statements relating to FIG. 5.

In contrast to the first embodiment, this Laval nozzle 5 has a conical (tapered) shape which changes into a cylindrical shape in the flow direction 6; the transition occurring after about 50% of the length 25 of the third portion 10.

Figure 7:
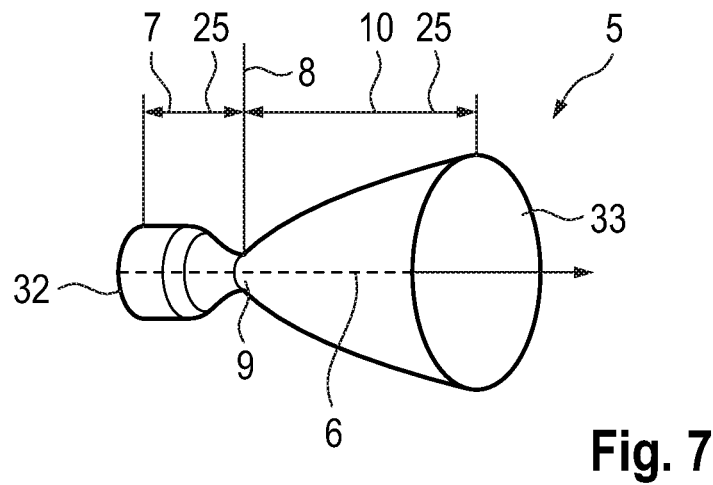
FIG. 7: shows a third embodiment of a Laval nozzle in a perspective view.

FIG. 7 shows a third embodiment of a Laval nozzle 5 in a perspective view. Reference is made to the statements relating to FIG. 5.

In contrast to the first embodiment variant, this Laval nozzle 5 has a bell-shaped contour of the third portion 10.

Figure 8:
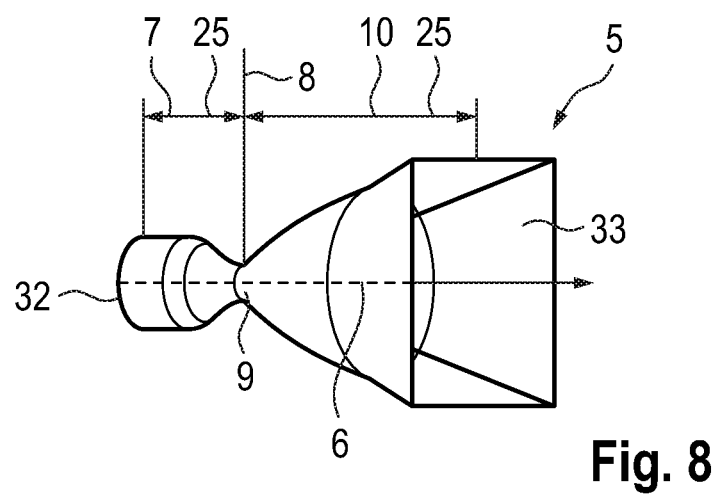
FIG. 8: shows a fourth embodiment of a Laval nozzle in a perspective view.

FIG. 8 shows a fourth embodiment of a Laval nozzle 5 in a perspective view. Reference is made to the statements relating to FIG. 7.

In contrast to the third variant, in the case of this Laval nozzle 5, only part of the third portion 10 is in the shape of a bell, and the rest of the third portion 10 is pyramidal or the bell-shaped part gradually changes to a square cross section at the outlet 33.

The bell-shaped diverging shape of the third portion 10 produces a particularly pronounced laminar flow of the gas stream 11, 16, 21 or particle stream 12, 20. As a result, the highest speed for the particles in the particle stream 12, 20 can be achieved since friction is reduced to a minimum.

Figure 9:
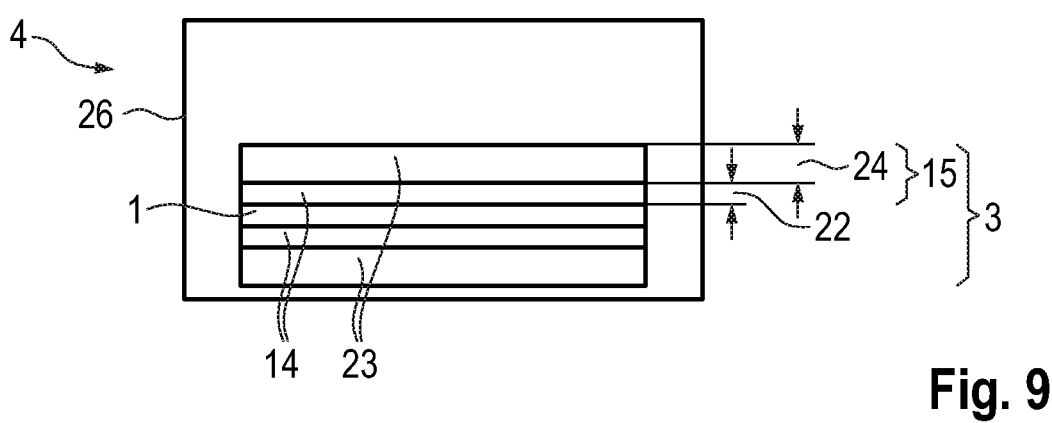
FIG. 9: shows a battery cell.

FIG. 9 shows a battery cell 4, at least comprising a housing 26 and at least one electrode foil 3 arranged in said housing, which battery cell is coated with at least one active material 2 by the process described. The electrode foil 3 comprises a carrier material 1 having a coating 15 on both sides.

A first (first applied) layer 14 of the coating 15 has a first thickness 22, and a second layer 23 applied subsequently to the first layer 14 and on top of this first layer 14 has a second thickness 24, wherein the second thickness 24 is greater than the first thickness 22. These statements apply to each of the coatings 15 applied to different sides of the carrier material 1.

LIST OF REFERENCE SIGNS

1 Carrier material
2 Active material
3 Electrode foil
4 Battery cell
5 Laval nozzle
6 Flow direction
7 First portion
8 Second portion
9 Flow cross section
10 Third portion
11 First gas stream
12 First particle stream
13 Binding material
14 First layer
15 Coating
16 Second gas stream
17 Inlet opening
18 Distance
19 Circumferential direction
20 Second particle stream
21 Third gas stream
22 First thickness
23 Second layer
24 Second thickness
25 Length
26 Housing
27 Compressor
28 Heating apparatus
29 Mixing device
30 Valve
31 Coating device
32 Inlet
33 Outlet

The invention claimed is:

1. A process for coating a carrier material with an active material for production of an electrode foil of a battery cell with a Laval nozzle, wherein the Laval nozzle has at least one converging first portion, one second portion having a smallest flow cross section, and one diverging third portion, the first, second and third portions being arranged one after the other along a flow direction; the process comprising at least the following steps:
- a) introducing a first gas stream via the first portion into the Laval nozzle;
- b) introducing a first particle stream, at least comprising a binding material for the active material, via the third portion into the Laval nozzle;
- c) introducing the active material as a second particle stream via the first portion into the Laval nozzle;
- d) mixing the first gas stream and the first particle stream and accelerating the first particle stream by means of the first gas stream flowing at a supersonic speed in the third portion; and
- e) subjecting the carrier material to the first particle stream and the second particle stream to form a layer of a coating;

wherein the first particle stream comprises only the binder material, and wherein the second particle stream comprises only the active material, such that the binder material and the active material are introduced at different portions of the Laval nozzle.

2. The process according to claim 1, wherein the first gas stream comprises at least one of nitrogen, helium, a mixture of nitrogen and helium, and air.

3. The process according to claim 1, wherein the material of the first particle stream is in powder form, is solvent-free and comprises at least one of conductive carbon black, NMC, graphite, CNT, SBR, CMC, PVDF, or porous graphite.

4. The process according to claim 1, wherein the first particle stream is mixed with a second gas stream before being introduced into the third portion.

5. The process according to claim 1, wherein the first particle stream is introduced into the third portion via a plurality of inlet openings.

6. The process according to claim 5, wherein at least two inlet openings are arranged at different distances from one another from the smallest flow cross section.

7. The process according to claim 5, wherein at least two inlet openings are arranged offset to one another along a circumferential direction running transversely to the flow direction.

8. The process according to claim 1, wherein a third gas stream is introduced via the third portion into the Laval nozzle.

9. The process according to claim 1, wherein steps a) to e) are carried out several times one after the other for the carrier material, so that the active material is applied in a plurality of layers.

10. The process according to claim 9,
wherein a first layer of the coating has a first thickness,
wherein a second layer applied subsequently to the first layer has a second thickness, and
wherein the second thickness is greater than the first thickness.

11. The process according to claim 9,
wherein a first layer of the coating has a first density,
wherein a second layer applied subsequently to the first layer has a second density, and
wherein the second density is lower than the first density.

12. The process according to claim 1, wherein, after step e), a density of the layer is increased by at most 10%.

* * * * *